3,394,062
METHOD FOR THE ELECTROLYTIC PRODUCTION OF HYDROGEN AND OXYGEN

William A. Rhodes, Phoenix, Ariz., assignor to Henes Manufacturing Company, Phoenix, Ariz., a corporation of Arizona
No Drawing. Continuation-in-part of application Ser. No. 265,061, Mar. 14, 1963. This application June 30, 1964, Ser. No. 379,348
7 Claims. (Cl. 204—129)

ABSTRACT OF THE DISCLOSURE

A process and electrolyte solution for electrolytic production of hydrogen and oxygen, wherein an electrolyte solution having a concentration greater than that required for maximum ionization of the solution is electrolytically decomposed at a temperature below the boiling point of water.

---

This application is a continuation-in-part of my copending application, Ser. No. 265,061 filed Mar. 14, 1963 and now abandoned, which was a continuation-in-part of my copending patent applications, Ser. No. 109,521 filed May 12, 1961 and now abandoned, and Ser. No. 182,726 filed Mar. 23, 1962 now Patent No. 3,268,872.

This invention relates to the production of hydrogen and oxygen gases by means of electrolytically decomposing water containing a chemical compound in a new and novel concentration, for the purpose of substantially increasing the production of hydrogen and oxygen per unit of electrical energy consumed.

In the electrolytic decomposition of water, as carried out on a commercial scale for the production of oxygen and hydrogen gases, instead of pure water which has too low an electrical conductivity, a 15% solution of caustic soda or its equivalent, caustic potash is used as an electrolyte. With caustic soda, NaOH, as electrolyte, the cathode reaction is

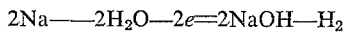

and the anode reaction is

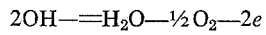

where $e=1$ faraday; so that $H_2$ is set free at the cathode, and $O_2$ at the anode, water disappearing, and the quantity of caustic soda remaining constant, since as much is formed at the cathode as is decomposed by the current.

As taught in the Handbook of Chemistry and Physics, the ohmic resistance of an aqueous solution of sodium hydroxide at a temperature of 18° centigrade decreases until a 15% concentration is attained, and thereafter increases with increased concentration, whereas the ohmic resistance of an aqueous solution of potassium hydroxide at a temperature of 18° centigrade decreases until a 30% concentration is attained, and thereafter increases with increased concentration. In like manner, this handbook shows that all other commercially significant electrolytes, such as hydrochloric acid, nitric acid and others, exhibit similar characteristics. This teaching has been the basis for selecting electrolyte concentrations for commercial use, to attain minimum ohmic resistance for the particular electrolyte used. In all cases, minimum ohmic resistance of the electrolyte solution is attained with electrolyte concentrations in the lower ranges, and greater concentrations have been carefully avoided in order to prevent increasing electrolyte resistance and thereby reducing operating efficiency.

Attempts have been made from time to time to increase the efficiency of electrolysis cells by doping or adulterating the electrolyte solution with various chemicals for the purpose of increasing conductivity, thereby making it possible to reduce terminal voltage due to a slight increase in conversion efficiency, while maintaining the same ampere flow. Recent patent teachings indicate that the addition of vanadium pentoxide to an electrolyte solution has the desirable effect of increasing operating efficiency.

It is an object of this invention to teach that efficiency losses, in electrolytic cells, due to heat evolution are inversely proportional to the concentration of electrolyte employed. For instance, it has been discovered that when maintaining a fixed input wattage and starting with a low concentration of electrolyte, heat evolution is great and gas production is small. As electrolyte concentration is increased, gas production increases, but heat evolution decreases. This increase of gas and decrease of heat has been discovered to continue uninterrupted through the minimum ohmic resistance concentration area of the electrolyte until said concentration is at or near saturation, at which point the electrolyte produces substantially no heat and gas production reaches maximum. Electrical energy normally wasted in heat is utilized here to increase gas production.

According to the present invention the electrolyte is electrolyzed below the boiling point (212° F.) of water.

As a specific example, the present invention comprises the ultilization of nickle plated iron or plain iron electrode materials operated at a temperature ranging from 33° F. to 211° F. and at a voltage range between 1.5 volts and 2.4 volts direct current to the cell. The current density being in a range between 1 to 2 amperes per square inch of electrode area and electrode spacing being one sixteenth of an inch or greater.

Electrolyte concentration is as described herein, all of the foregoing being utilized in the practice of the process in accordance with the present invention.

It is a further object of this invention to teach the use of a preferred electrolyte solution containing by weight one part of water to one part of potassium hydroxide. Accordingly, the concentration of potassium hydroxide is greater than 35 percent. Experiments have shown this to be a great advance in the art of electrolyte solutions for high gas production, low electrical consumption, and low heat evolution. Likewise, the concentration of sodium hydroxide is greater than 20 percent.

Although this invention is the result of laboratory testing, and is therefore independent of theoretical data presently available, it is believed that increased electrolyte concentrations result in a surplus of electrolyte in solution which is not ionized and which is available for ionization at all times during cell operation to offset impoverishment of the electrolyte at the anode caused by migration of positive ions toward the cathode and concentration thereof in the catholyte. This surplus availability of electrolyte tends to maintain maximum ionization of the electrolyte solution matrix, and therefore maintain maximum conductivity thereof at all times. This would explain the continuing increase in cell efficiency as electrolyte concentration is increased to a point at or near saturation.

It is of particular significance that the use of an electrolyte as described hereinabove, has for the first time made possible the construction of a small, inexpensive, portable cell for the economic electrolytic decomposition of water, with sufficient production of hydrogen and oxygen gases for practical consumption thereof as a welding torch fuel, using 110 volts alternating current from a standard electrical outlet as the prime power supply.

As has been already indicated, concentrated electrolytic solutions, and particularly those containing as electrolytes, hydroxides of the alkali metals, electrolyzed below the boiling point of water, are embraced within the purvue of this invention, as are all variations coming within the scope of the appended claims.

I claim:
1. A process for the production of hydrogen and oxygen gases wherein an aqueous electrolyte solution containing electrolyte in concentration greater than that required for maximum ionization of said solution, is electrolytically decomposed at a temperature below the boiling point of water.

2. A process for the production of hydrogen and oxygen gases wherein an electrolyte solution containing electrolyte in concentration greater than that required for minimum ohmic resistance of said solution, is electrolytically decomposed at a temperature below the boiling point of water.

3. A process for the production of hydrogen and oxygen gases wherein an aqueous electrolyte solution containing an alkali metal hydroxide in concentration greater than that required for maximum ionization of said solution, is electrolytically decomposed at a temperature below the boiling point of water.

4. A process for the production of hydrogen and oxygen gases wherein an aqueous electrolyte solution containing an alkali metal hydroxide in concentration greater than that which produces minimum ohmic resistance for said solution, is electrolytically decomposed at a temperature below the boiling point of water.

5. A process for the production of hydrogen and oxygen gases wherein an aqueous electrolyte solution having a concentration of potassium hydroxide greater than 35%, is electrolytically decomposed at a temperature below the boiling point of water.

6. A process for the production of hydrogen and oxygen gases wherein an aqueous electrolyte solution having a concentration of sodium hydroxide greater than 20% is electrolytically decomposed at a temperature below the boiling point of water.

7. A process for the production of hydrogen and oxygen gases wherein an aqueous electrolyte solution containing electrolyte in concentration greater than that required for maximum ionization of said solution, is electrolytically decomposed at a temperature below the boiling point of water, said process comprising the utilization of electrodes energized in a direct current voltage range between 1.5 volts and 2.4 volts and operating in a temperature range between 33° F. and 211° F. and having a current density between 1 and 2 amperes per square inch while the electrode spacing is greater than one sixteenth of an inch.

References Cited
UNITED STATES PATENTS

| | | | |
|---|---|---|---|
| 1,446,736 | 2/1923 | Clark | 204—129 |
| 1,543,357 | 6/1925 | Baur. | |
| 2,390,591 | 11/1945 | Janes | 204—129 |
| 2,433,871 | 1/1948 | Sutherland et al. | 204—265 |
| 3,038,853 | 6/1962 | Cole | 204—265 |

H. M. FLOURNOY, *Assistant Examiner.*

HOWARD S. WILLIAMS, *Primary Examiner.*